A. KRUEGER.
GAFF HOOK.
APPLICATION FILED NOV. 11, 1911.
1,049,875.
Patented Jan. 7, 1913.
2 SHEETS—SHEET 1.
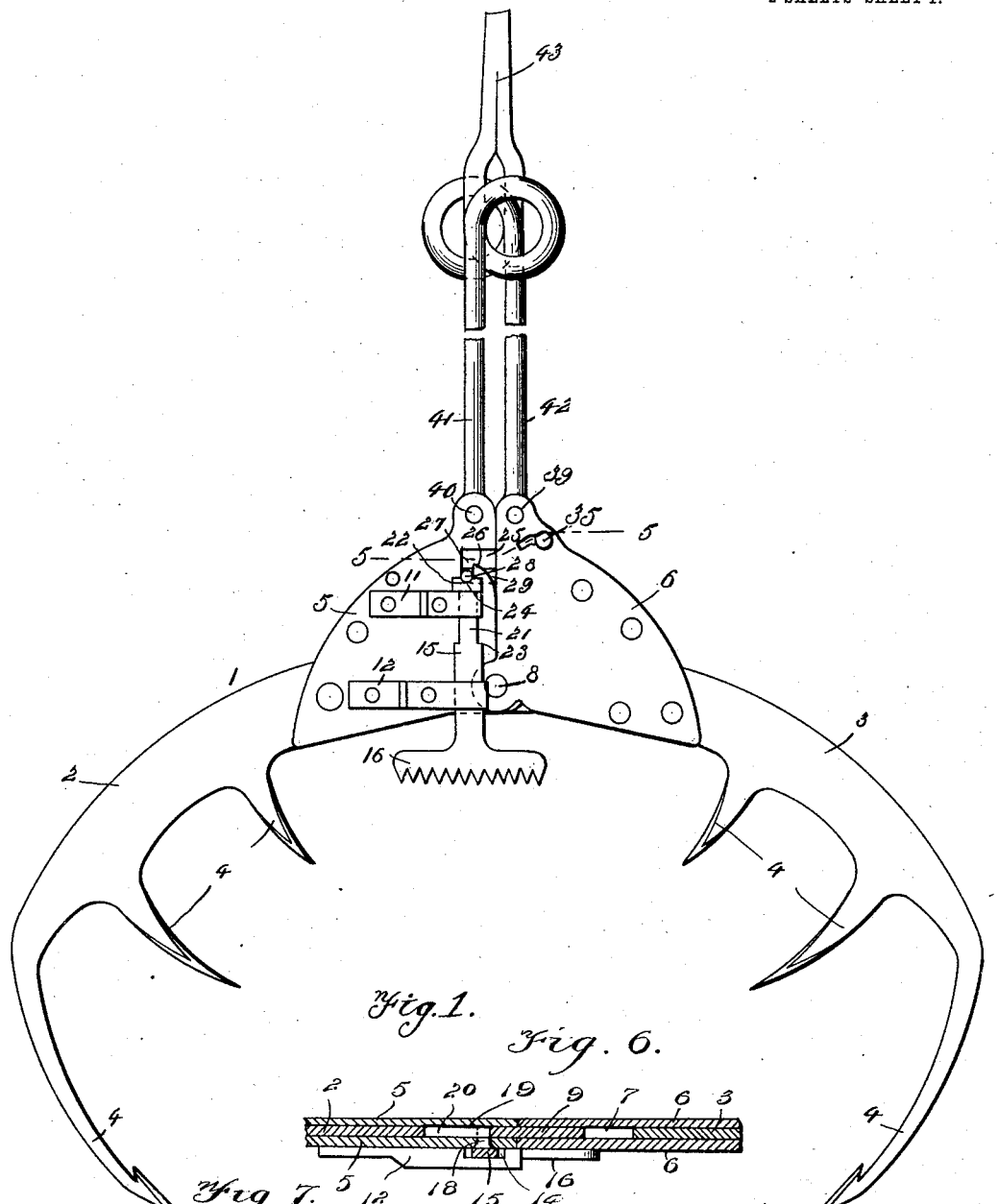
Witnesses
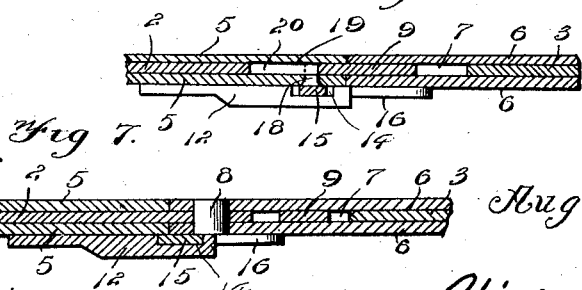
Inventor
August Krueger

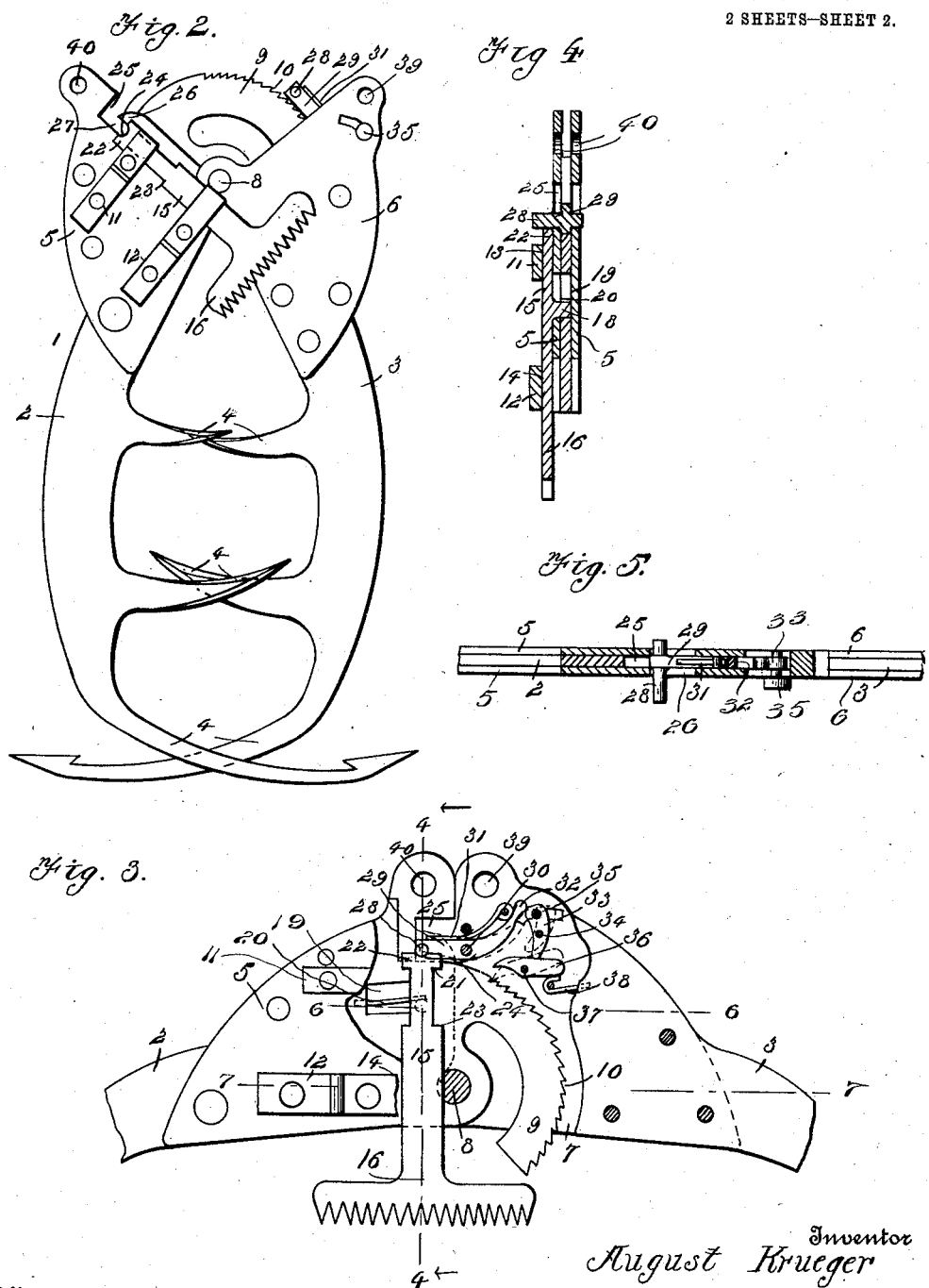

UNITED STATES PATENT OFFICE.

AUGUST KRUEGER, OF TOMAHAWK, WISCONSIN.

GAFF-HOOK.

1,049,875.  Specification of Letters Patent.  Patented Jan. 7, 1913.

Application filed November 11, 1911. Serial No. 659,731.

*To all whom it may concern:*

Be it known that I, AUGUST KRUEGER, a citizen of the United States, residing at Tomahawk, in the county of Lincoln and State of Wisconsin, have invented new and useful Improvements in Gaff-Hooks, of which the following is a specification.

This invention relates to certain new and useful improvements in gaff hooks.

In carrying out my invention it is my purpose to provide a gaff hook having a pair of spring pressed prongs and a trigger for operating the prongs, with simple and effective means for securely locking the prongs after the trigger has been actuated.

In gaff hooks of the ordinary construction, spring actuating means have been employed for swinging the prongs so as to bring the same tightly into engagement with the fish caught by the hook, but in such devices, and especially when the same are employed in catching large fishes, the wiggling of the fish often effects the separation of the prongs against the pressure of the spring, and permits the escape of the fish, even though the same have been lacerated.

I aim to provide a simple and effective gaff which, when once sprung, will have its jaws so tightly contacted upon the fish and automatically locked in such a position when the said jaws are sprung, as to prevent the opening of the jaws to any degree independent of the tension of the main spring, and thus effectively prevent the escape of the fish.

It is a further object of my invention to provide a gaff hook of this character which embodies the desirable features of simplicity, cheapness in construction, and accuracy in operation.

With the above and other objects of a similar nature in view, the invention resides in the construction, combination and operative arrangement of parts described herein and falling within the scope of the appended claims.

In the drawings, Figure 1 is a front elevation of a gaff hook constructed in accordance with the present invention. Fig. 2 is a similar view, the gaff hooks being in their closed and locked position, the main or operating spring being removed. Fig. 3 is a view of my improved gaff hook showing the jaws of the same in their open position and parts being broken away to illustrate the operating mechanism. Fig. 4 is a sectional view upon the line 4—4 of Fig. 2. Fig. 5 is a sectional view upon the line 5—5 of Fig. 1. Fig. 6 is a sectional view upon the line 6—6 of Fig. 3. Fig. 7 is a sectional view upon the line 7—7 of Fig. 3.

Referring now to the drawings in detail, the numeral 1 designates my improved gaff hook. This hook is made up of a pair of jaws, designated respectively by the numerals 2 and 3. The jaws are each constructed of a flattened metallic member, each being provided with a plurality of teeth 4, and the jaws adjacent their meeting faces are provided with side plates 5 and 6, the same being preferably sustained upon each of the sides of each of the jaws.

The plates 6 upon the jaw 3 are each provided with projecting ears adjacent their lower extremity, and the plates upon the jaw 2 are cut away to receive the said ears while the jaw proper is provided with a projection which is formed with an opening registering with the opening of the ears. These openings are adapted for the reception of a pintle 8, whereby the said jaws are hingedly connected together, and whereby the meeting edges of the said jaws will lie in a parallel plane and will contact when the gaff hook is in its open position. The jaw 2 is provided with a curved tongue 9, and this tongue is adapted to enter the pocket 7 which is provided by the plates 6. The outer edge of this tongue is provided with teeth 10.

The plate 5 upon one of the faces of the jaw 2 is formed with a pair of spaced strips 11 and 12, the same having registering depressions or passages 13 and 14 through which the shank 15 of the trigger 16 extends. The plate 5 is further provided with a slit or opening 17 through which a stud 18 provided upon the stem 15 projects to a space or pocket provided between the plates by cutting away the inner or enlarged end of the jaw 2. This space or pocket which may be designated by the numeral 19, is adapted to receive a flattened spring 20, and the said spring contacts with the stud 18 and normally forces the trigger 16 downwardly. The extremity of the shank 15 is reduced as at 21, and is provided with a head 22 which is of a greater diameter than the depression 13 provided in the strip 11, so that the head limits the movement of the trigger 16 in a downward direction, while the shoulders 23 provided by the reduced portion 21 limit the movement of the said trigger in an upward direction. The head 22 of the trigger 16 is preferably formed with a central substantially semi-cylindrical depression 24, the purpose of which will presently be set forth. The plates 5, as well as the end of the hook 2, adjacent the edges thereof, are cut away as at 25, and the lower walls provided by the said cut away portion are formed with substantially V-shaped upstanding portions 26 (see Fig. 2) and the space between the inner edges of the said upstanding portions and the walls provided by the cut away portions proper form a slot 27, the said slot being adapted to receive the off-set finger 28 provided upon a catch member 29. This catch member is adapted to sustain the jaws in their open position as well as to release the jaws when the trigger contacts with its finger 28 and to perform other functions which will be presently set forth.

The catch 29 comprises a substantially L-shaped member which is pivoted at the juncture of its arms between the plates 6 as at 30, and the longer arm or that provided with the finger 28 is normally forced downwardly through the medium of a spring 31. The upper arm of the catch, which is designated by the numeral 32, normally contacts with a release dog 33 which is pivoted between the plates 6 as at 34. This release dog is provided with a head 35 which extends through a substantially L-shaped opening provided in one of the plates 6. The release dog 33 has its lower portion curved, and normally contacts with a pawl 36 which is pivoted beyond its center as at 37, and which is normally forced into engagement with the teeth 10 of the curved rack or toothed member 9 through the medium of a spring 38. It will be noted that by providing the release dog 33 with the head 35, that said head may be employed to swing the release dog upon its pivot to bring the same either into contact with the pawl 36 to swing the said pawl out of engagement with the teeth 10 of the curved tongue 9, or to permit of the tension of the spring 38 swinging the said dog into engagement with the teeth of the tongue 9. The upper extremities of each of the arms 2 and 3 adjacent their meeting faces are provided with openings 39 and 40, and secured within these openings are the spring arms 41 and 42 provided upon the handle 43.

Briefly stated, the operation of the device is as follows. The gaff, when in its open position, is forced into contact with the fish to be captured. This contact will force the trigger 16 upwardly so as to raise the finger 28 of the catch member 29 out of the slot 27, which movement causes the arm 32 of the said catch member to contact with the upper portion of the safety or release dog 33, which, swinging upon its pivot, will be brought away from the dog 36 to permit its spring 38 to force the said dog within the path of the teeth 10 of the arcuate tongue 9, the spring members 41 and 42, in the meantime, swinging the jaws 2 and 3 upon their pivot 8, so as to bring their teeth 4 toward each other, and it will be readily noted that the dog 36 engaging with the teeth 10 successively will lock the arms against accidental movement to prevent the opening of the said jaws. In order to open the jaws, the safety or release dog 33 must be swung in an opposite direction, which causes its lower curved portion to ride upon the upper curved portion of the ratchet dog 36 and to raise the same upon its pivot, when the jaws 2 and 3 may be readily swung apart and the fish removed therefrom. The opening of the jaws will also set the catch 29 and will prevent the accidental swinging of the said jaws toward each other, even when under the pressure of the spring arms 41 and 42.

The simplicity of this device and the advantages of the same will, it is thought, commend themselves to those skilled in the art to which such inventions appertain without further detailed description.

Having thus described the invention, what I claim is:—

1. A gaff hook comprising a pair of pivoted jaws, a handle provided with springs for normally swinging the jaws toward each other, a trigger, a catch pivoted to one of the jaws and adapted to be operated by the trigger, and means released by the catch for sustaining the jaws in a locked position.

2. A gaff hook comprising a pair of pivoted jaws, and spring members connected with the handle of the hook for normally forcing the jaws together, a trigger carried by one of the jaws, means for normally sustaining the trigger in its lowered position, a catch having an off-set finger contacting the trigger and adapted to be actuated by the trigger when the same is operated to release the jaws, a safety release dog within the path of the catch, and means actuated by the release dog to prevent the spreading of the jaws away from each other.

3. A gaff hook comprising a pair of pivoted jaws, a handle provided with springs for the jaws and adapted to normally swing the jaws toward each other, a spring catch for normally preventing the swinging of the jaws, a trigger positioned below the catch and adapted to actuate the same to permit of the swinging of the said jaws when the trigger is contacted, a safety release dog having a head pivoted to one of the jaws of the gaff within the path of the catch, a pivoted pawl adapted to be normally contacted by the safety catch, and the opposite jaw of the gaff provided with a toothed member normally engaged by the pawl, substantially as and for the purpose set forth.

4. A gaff hook comprising a pair of pivoted jaws, one of said jaws being provided with a toothed tongue, a sliding trigger member upon one of the said jaws, means for normally forcing the trigger downwardly, a catch member carried by the second jaw and arranged within the path of the upper end of the trigger, said catch member being pivoted to the second jaw and being provided with an off-set arm, a spring for normally forcing the catch against the trigger, a pivoted safety release dog arranged within the path of the off-set arm of the catch, a pivoted pawl normally contacted by the safety release dog, a spring for the pawl and adapted to swing the said pawl into engagement with the teeth of the tongue of the first named jaw when the safety or release dog is swung out of contact therewith, a handle for the gaff, and said handle being provided with depending spring arms connected with the jaws and adapted to normally force the said jaws to a closed position.

In testimony whereof I affix my signature in presence of two witnesses.

AUGUST KRUEGER.

Witnesses:
H. G. BELL,
H. W. McCARTHY.

---

Copies of this patent may be obtained for five cents each, by addressing the "Commissioner of Patents, Washington, D. C."